US006651245B1

United States Patent
Damron et al.

(10) Patent No.: US 6,651,245 B1
(45) Date of Patent: Nov. 18, 2003

(54) SYSTEM AND METHOD FOR INSERTION OF PREFETCH INSTRUCTIONS BY A COMPILER

(75) Inventors: Peter C. Damron, Fremont, CA (US); Nicolai Kosche, San Francisco, CA (US)

(73) Assignee: Sun Microsystems, Inc., Santa Clara, CA (US)

( * ) Notice: Subject to any disclaimer, the term of this patent is extended or adjusted under 35 U.S.C. 154(b) by 508 days.

(21) Appl. No.: 09/679,433

(22) Filed: Oct. 3, 2000

(51) Int. Cl.⁷ .................................................. G06F 9/45
(52) U.S. Cl. ...................... 717/159; 717/151; 711/213
(58) Field of Search ................. 717/120, 130, 717/151, 159; 711/213

(56) References Cited

U.S. PATENT DOCUMENTS

| | | | | |
|---|---|---|---|---|
| 5,493,675 A | | 2/1996 | Faiman, Jr. et al. | 395/700 |
| 5,627,982 A | | 5/1997 | Hirata et al. | 395/382 |
| 5,634,025 A | * | 5/1997 | Breternitz, Jr. | 712/207 |
| 5,704,053 A | * | 12/1997 | Santhanam | 707/158 |
| 5,854,934 A | * | 12/1998 | Hsu et al. | 717/161 |
| 5,950,007 A | * | 9/1999 | Nishiyama et al. | 717/161 |
| 6,549,930 B1 | * | 4/2003 | Chrysos et al. | 709/104 |
| 2003/0005419 A1 | * | 1/2003 | Pieper et al. | 717/141 |

OTHER PUBLICATIONS

Chiu, J–C, Shiu, M–M, Chi, S–A, Chung, C–P, "Instruction cache prefetching directed by branch prediction", IEEE 1999, p. 241–246, retrieved from IEEE database Apr. 17, 2003.*

Klaiber, Alexander C., Levy, Henry M., "An Architecture for Software–Controlled Data Prefetching", 1991 ACM, p. 43–53, retrieved from ACM Portal database Apr. 17, 2003.*

Sanchez, F. Jesus and Gonzalez, Antonio, "Cache Sensitive Modulo Scheduling", 1997 IEEE, p. 338–348, retrieved from IEEE database Apr. 17, 2003.*

* cited by examiner

Primary Examiner—Tuan Q. Dam
Assistant Examiner—Mary Steelman
(74) Attorney, Agent, or Firm—Park, Vaughan & Fleming LLP

(57) ABSTRACT

The present invention discloses a method and device for placing prefetch instruction in a low-level or assembly code instruction stream. It involves the use of a new concept called a martyr memory operation. When inserting prefetch instructions in a code stream, some instructions will still miss the cache because in some circumstances a prefetch cannot be added at all, or cannot be added early enough to allow the needed reference to be in cache before being referenced by an executing instruction. A subset of these instructions are identified using a new method and designated as martyr memory operations. Once identified, other memory operations that would also have been cache misses can "hide" behind the martyr memory operation and complete their prefetches while the processor, of necessity, waits for the martyr memory operation instruction to complete. This will increase the number of cache hits.

52 Claims, 4 Drawing Sheets

PREFETCH SCHEDULING METHOD ACCORDING TO THE PRESENT INVENTION

PRIOR ART CACHE

FIG. 1A

MUTUAL DEPENDENCE PROBLEM

PREFETCH SCHEDULING METHOD ACCORDING TO THE PRESENT INVENTION

SYSTEM WITH COMPILER ACCORDING TO THE CURRENT INVENTION

FIG. 3

COMPILER ACCORDING TO THE PRESENT INVENTION

FIG. 4

SYSTEM AND METHOD FOR INSERTION OF PREFETCH INSTRUCTIONS BY A COMPILER

RELATED APPLICATIONS

The present patent application is related to U.S. patent application Ser. No. 09/679,434, Filed on Oct. 3, 2000, entitled "SYSTEM AND METHOD FOR SCHEDULING INSTRUCTIONS TO MAXIMIZE OUTSTANDING PREFETCHES AND LOADS", Ser. No. 09/679,431, Filed on Oct. 3, 2000, entitled "SYSTEM AND METHOD FOR SCHEDULING MEMORY INSTRUCTIONS TO PROVIDE ADEQUATE PREFETCH LATENCY", and Ser. No. 09/685,431, Filed on Oct. 10 2000, entitled "HEURISTIC FOR IDENTIFYING LOADS GUARANTEED TO HIT IN PROCESSOR CACHE", those applications having been assigned to the same assignee and being incorporated herein by reference.

BACKGROUND OF THE INVENTION

1. Field of the Invention

This invention pertains generally to software compilers. More particularly this invention is directed to a system and method for the scheduling and insertion of prefetch instructions by a compiler during compilation of software programs to maximize the efficiency of the code.

2. The Prior Art

Current computer systems include, among other things, a memory system and a processing unit (or processor or central processing unit (CPU)). A memory system serves as a repository of information, while the CPU accesses information from the memory system, operates on it, and stores it back.

It is well known that CPU clock speeds are increasing at a faster rate than memory speeds. This creates a time gap, typically measured in clock cycles of the CPU, between the request for information in memory to when the information is available inside the CPU. If a CPU is executing instructions in a linear manner, when a currently executing instruction needs to read a memory location from the memory system, the request is "very urgent". The processor must wait, or stalls, while the memory system provides the data requested to the CPU. The number of CPU clock cycles between the clock cycle when the memory request was made to the cycle where the data is available to the instruction that needed it in the CPU is called the latency of the memory.

Figure 1A:
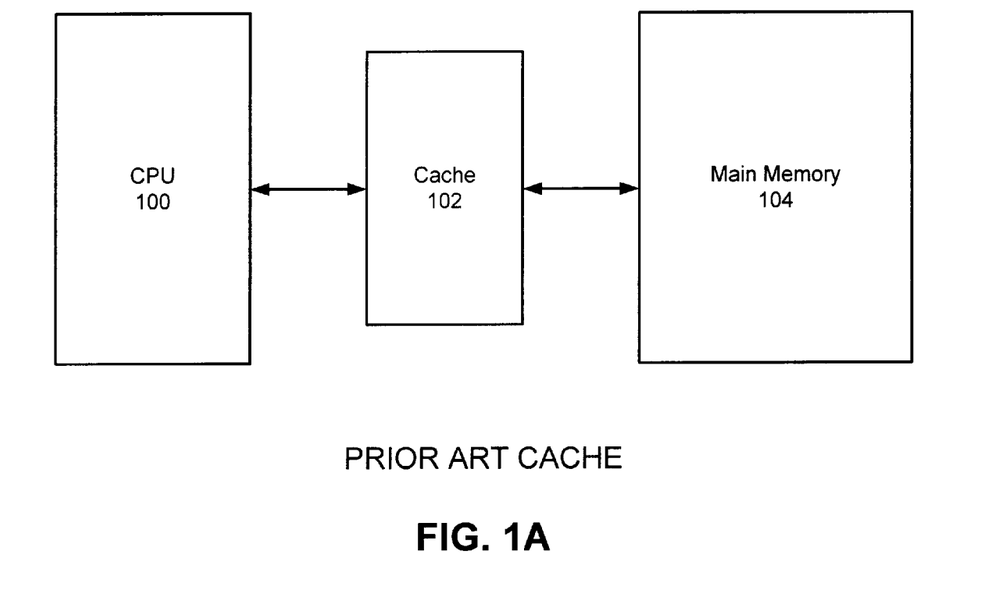
FIG. 1A is a block diagram of prior art CPU-cache-memory.

Caches are used to help alleviate the latency problem when reading from main memory. A cache is specially configured, high-speed, expensive memory in addition to the conventional memory (or main memory). FIG. 1A depicts a conventional hierarchical memory system, were a CPU 100 is operatively coupled to a cache 102, and the cache is operatively coupled to the main memory 104. By placing the cache (small, relatively fast, expensive memory) between main memory (large, relatively slow memory) and the CPU, the memory system as a whole system is able to satisfy a substantial number of requests from the CPU at the speed of the cache, thereby reducing the overall latency of the system.

When the data requested by the CPU is in the cache (known as a "hit"), the request is satisfied at the speed of the cache. However, when the data requested by the CPU is not in the cache (known as a "miss"), the CPU must wait until the data is provided from the slower main memory to the cache and then to the CPU, resulting in greater latency. As is well known in the art, the frequency of cache misses is much higher in some applications when compared to others. In particular, commercial systems employing databases (as most servers do) miss cache with much greater frequency than many systems running scientific or engineering applications.

To help address the problem of latency and to increase the hit to miss ratio associated with cache memory, many computer systems have included instructions for prefetching data from memory to cache. For example, instructions set architectures (ISA's), such as SPARC™ V9, support software data prefetch operations. The instruction's use, however, is left entirely to the program executing in the CPU. It may not be used at all, or it may be used with little or no intelligence, adding little in the way added performance. Because the level of knowledge needed about the CPU and its memory is extremely detailed in order to effectively use prefetch instructions, their use is generally left to compilers. For compilers to effectively use prefetch instructions, effective algorithms are needed which can be implemented by the compiler writers.

The algorithms needed for scientific and engineering applications are often not as complex as for many commercial systems. This is due to the fact that scientific and engineering applications tend to work on arrays that generally reside in contiguous memory locations. Thus, predicting which memory addresses will be required for the executing instruction stream is both relatively easy to predict and can be predicted in time to address latency concerns. Generally there will be plenty of time to allow for the latency between the issuing of the memory prefetch instruction, and the time when an executing instruction needs the contents of that memory location.

For database applications and other commercial applications, however, predicting which areas of memory will be required is much more difficult. Because of the nature of the programs, there can be and often is a need for the contents of memory locations that are not contiguous. In addition to the non-contiguous memory locations, the executing programs rarely leave enough time between identifying when non-cache memory needs to be read into cache memory, and when it will be needed by an executing instruction. This means that there is often insufficient latency time (in CPU cycles) between the address forming operation and the memory operation (associated with the address) to cover the prefetch latency. In these cases, there is no readily discernable way of establishing when a prefetch instruction should be issued to minimize latency.

Accordingly, there is a need for a method and apparatus which can schedule memory prefetch instructions such that the number of times adequate latency for the prefetch instruction is provided can be maximized. The present invention satisfies this need and other deficiencies found in the background art.

BRIEF DESCRIPTION OF THE INVENTION

The present invention discloses a method and device for placing prefetch instruction in an assembly code instruction stream. It involves the use of a new concept called a martyr memory operation instruction.

The most difficult aspects of prefetch insertion is determining when and where to put each prefetch instruction to maximize cache hits. The present invention discloses a method to determine where to insert prefetches in general, and additionally discloses a novel use of a memory operation instruction called a martyr memory operation instruction. A martyr memory operation instruction is an instruction that cannot have a prefetch inserted into the instruction stream to prevent a cache miss, and has nearby memory operation instructions that would ordinarily also miss cache. Once the martyr memory operation instruction is identified, the time the martyr instruction takes to retrieve the contents of an address from main memory rather than cache will simultaneously be used by other memory operation instructions to prefetch values from main memory to cache. Thus, the memory operation instruction is considered to have given itself, or be a martyr to, the other instructions that can "hide" their prefetches in the time shadow of the martyr instruction.

The process starts by making an initial evaluation of memory operations to coarsely divide them into memory operations that are likely to hit cache or miss cache. The memory operations that have been put in the group likely to hit cache are labeled as cache hits. This process continue through the entire compiled (relocatable assembly code level) instruction or code stream. The next step is to very aggressively insert prefetches corresponding to cache miss instructions—this aggressive prefetch placement is novel, and is the opposite of what is usually done. An instruction scheduler is then run over the assembly code. The scheduler will change the order of instructions to optimize the performance of the target processor, and in so doing potentially change the number of instructions between a prefetch instruction and its target (associated) memory instruction. Next each memory operation is examined and its label changed, if necessary, from a cache hit to a cache miss or vice-versa due to the changes carried out by the code scheduler.

A unique algorithm is now applied to the code base, having the effect of identifying which prefetch instructions will be removed and, at the same time, identifying martyr memory operation. This has the effect of greatly reducing cache misses in the code, in part by identifying cache miss memory operations to become cache hit memory operations because they can hide in the time shadow of martyr memory operations.

DETAILED DESCRIPTION OF PREFERRED EMBODIMENTS

Person of ordinary skill in the art will realize that the following description of the present invention is illustrative only and not in any way limiting. Other embodiments of the invention will readily suggest themselves to such skilled persons having the benefit of this disclosure.

Ideally, prefetch instructions are added before an instruction that needs the contents of a location in main memory such that by the time the contents of memory are needed, the contents have arrived in cache. The time needed between the issuing of a prefetch instruction and when the data requested is available in cache is different for each processor. This is true for processors with single and multiple levels of cache. To keep the description of the invention from venturing into excessive and unimportant details of each processor type, "a" cache will be discussed. However, as will be obvious to a person of ordinary skill in the art and with the benefit of the present disclosure, this invention will work equally well on processors with any known cache structure, including multi-leveled cache, and all such variations are understood to be included when discussing "a" cache.

When looking at an instruction in an instruction or code stream (where a stream has at least two instructions) that references a memory location, a prefetch instruction is added earlier in the code stream. The idea is to allow enough time between the prefetch and original instruction to allow the desired data to be read into cache before the original instruction needs it. The prefetch instruction and the original instruction form a pair of instructions, referred to as the prefetch instruction and its target instruction, or prefetch-target. Thus, the prefetch must be issued early enough to allow the data it is retrieving to be in cache before being needed by the target instruction.

As mentioned earlier, a minimum time between the prefetch and the target is needed for any particular processor. Since each instruction (in assembly code) usually takes a known number of processor cycles and each processor cycle is a known amount of time, the time difference between the two instructions in an assembly-level instruction stream can be accurately predicted. The time can be calculated by adding the processor cycles used by each instruction that lies between the prefetch and its target, and then multiplying that by the amount of time each processor cycle takes. However, since cache to memory transfers are often measured in processor cycles rather than in absolute time, it will be the case that knowing the number of processor cycles between the prefetch and target is enough to know if the data will be in cache when needed by the target. This computation is referred to as the "distance" between the prefetch and the target instruction.

There is a limit to how many instructions in front of a target instruction a prefetch may be placed. That limit is when the address reference register gets loaded. A code example is shown below. For this example and for the rest of this disclosure, "ld" means load, "r n" means register n, such as r6=register 6, "pre" means prefetch, and square brackets refer to the address pointed to by the value in the brackets. To minimize unneeded complexity, the examples will use only "ld" instructions. However it is to be understood that "ld" could be any instruction involving a memory operation.

In the text of this disclosure instructions that invoke operations dealing with memory, including loads and stores, will be referred to generically as memory operation instructions. In addition a memory operation instruction and a memory operation refer to the same concept: an individual line of code that, when executed by a processor, will involve some action or actions with memory.

| | |
|---|---|
| L-1 | ld [r5], r4 |
| | o |
| | o |
| | o |
| | ld [r6], r2 |
| L-2 | ld [r4], r3 |

In the sequence above, assuming r4 is not loaded between lines L-1 and L-2, a prefetch for r4 cannot be placed ahead of line L-1 because the contents of r4 is set in line L-1. Thus, knowing that line L-2 contains an instruction making a memory reference using r4 as the address, a prefetch could be added:

| L-1 | ld[r5],r4 |
|     | pref [r4] |
|     | o |
|     | o |
|     | ld [r6], r2 |
| L-2 | ld [r4], r3 |

A concept is now introduced called a martyr load. A martyr load is a memory operation that is determined to be a likely cache miss and has no prefetch instruction associated with it. Once identified, martyr loads will be known to stall the processor until the read from memory into the processor registers is completed. Clearly this is generally undesirable, but in any instruction stream there will always be some memory operations that cannot have an associated prefetch added with enough distance to prevent a stall. Once identified, these instructions are used to provide adequate latency to the other prefetch instructions, that is, while the processor is stalled because of a martyr memory operation, other prefetches may complete that otherwise could not. These instructions thus martyr themselves for the other memory operations, hence the name.

Figure 1B:
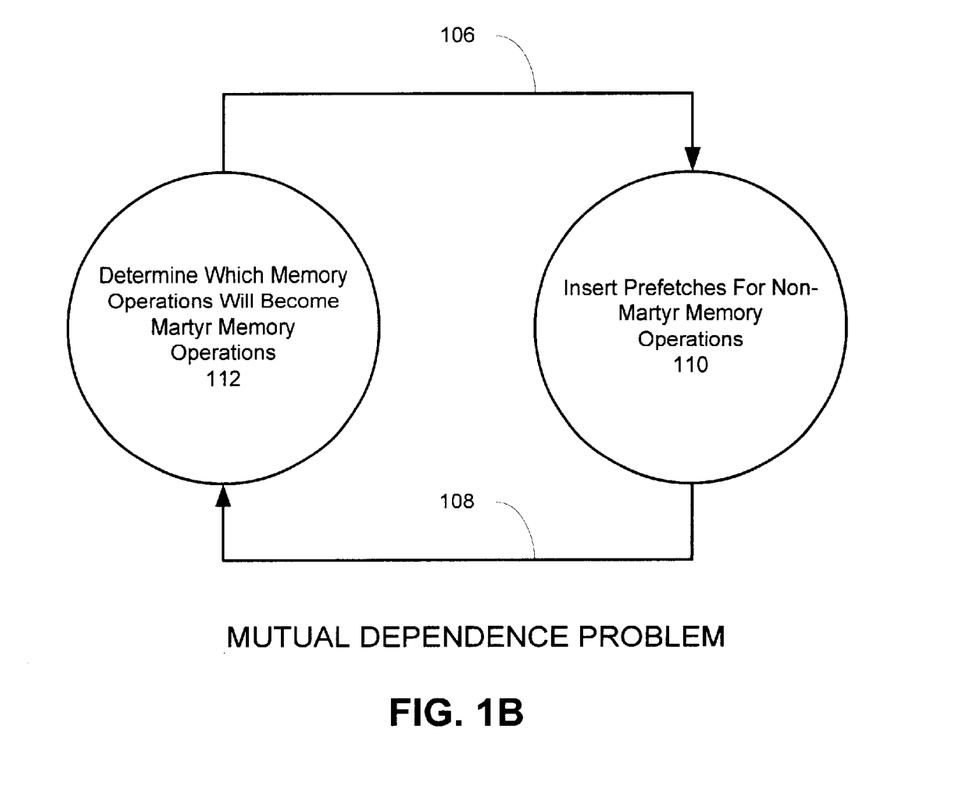
FIG. 1B is a block diagram illustrating a mutual dependence problem.

It is difficult to identify martyr memory operations. The distance between a prefetch and its target depends on the instructions between them—including any martyr memory operations. Thus, to know where to put prefetches the location of the martyr memory operations must be known. But the martyr memory operations cannot be identified until the prefetches are put into the instruction stream. Only then will it be known which prefetch-memory operation pairs will fail to have enough distance between them, making them candidates for a martyr memory operation. This mutual dependence is shown in FIG. 1B. To insert the prefetches in circle 110 we must know where the martyr memory operations are located—so path 108 is followed to that action in circle 112. But circle 112 cannot determine which memory operations are candidates for martyr memory operations until the prefetches are in place—so path 106 is taken back to circle 110.

There are two general approaches to a mutually dependent problem as found in FIG 1B. The first is to try a universal solution for both at the same time. Experience and experimentation has shown that these solutions tend to be extremely complex, while yielding no apparent advantage in implementation over other solutions. The other approach is to make a heuristically-based start and use an algorithm that closes in an optimal solution, usually resulting in a cleaner implementation with results at least as good as the "two solution" approach.

Using the second approach discussed above, the process starts with a heuristically derived initial step. It was determined experimentally that a good start can be made by carrying out an assessment of which memory operations are going to be cache hits and which will be cache misses. There are a number of ways known in the art of making that initial assessment. Experimentation in prototypes of the present invention have not indicated one clearly superior algorithm. However, there is an algorithm that is straight forward, is as good as others tested, and is currently in use in the present invention. The method used is to assume any memory operation referencing a stack variable will be a cache hit, and any memory operation referencing a variable not in a stack will be a cache miss.

Figure 2:
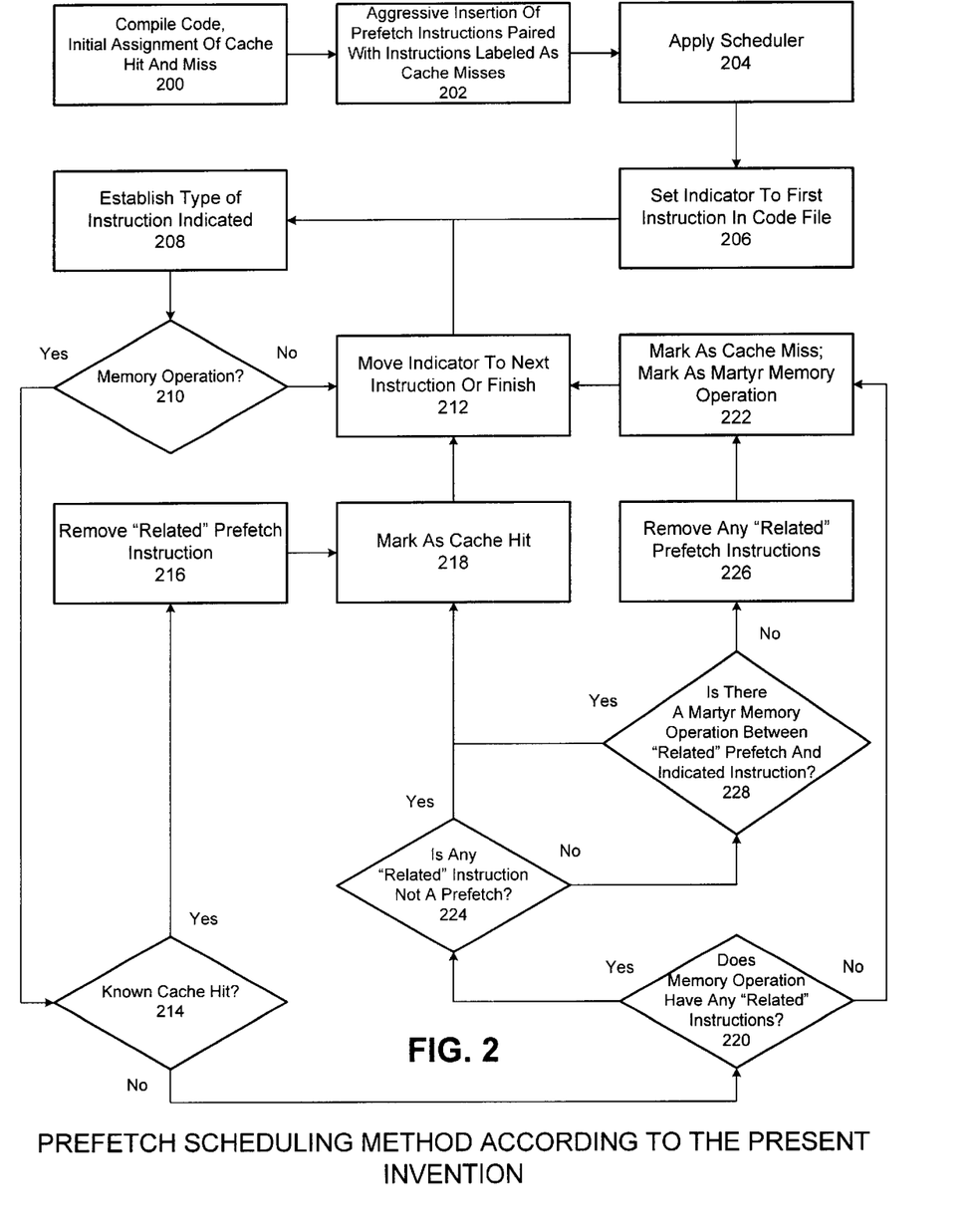
FIG. 2 is a block diagram showing a method according to the present invention.

This is shown in box 200 in FIG. 2. In addition to fully automated fixed algorithms, it is worth noting that the present invention also contemplates the use of direct programmer input as well as cache miss or other profiling techniques. Any of these alternatives may be used to identify which instructions may be cache hits or cache misses. As will be appreciated by one of ordinary skill in the art and with the benefit if the present disclosure, there will be other cache-hit/cache-miss techniques that may be used in addition to the algorithms, profiling methods, and programmer input just mentioned. Any of theses and others may be used while keeping within the scope of the inventive aspects disclosed herein. All such variations are fully contemplated by the current disclosure.

The initial action completed in box 200 is to compile the source code in a manner as is well known in the art. The assignment of cache hits and misses is made at the relocatable assembly code level, and may be made within individually compiled files, modules, linked libraries, objects, or any other convenient portion of what will eventually be an executable image, up to and including any size of a relocatable code base (final linking and address resolution will not have been done yet). When the source files are in assembly language of some type, the initial assignment of cache hit and cache miss may be made to individual instructions. After assigned cache hit or cache miss tags to memory operations, box 200 is left and box 202 entered.

The action in box 202 involves very aggressive insertion of prefetch instructions, creating prefetch-target, or in this case prefetch-memory operation pairs. "Aggressive" means that prefetch instructions are added even when the distance is too small, which is in direct contradiction to prior art prefetch insertion algorithms. In the present invention there can be specific exceptions made to this aggressive insertion policy. Currently, one exception is when the address under consideration for a prefetch is based on an address that has been previously assigned a prefetch, with no intervening register assignment. An example follows.

| L-3 | ld [r5], r4 |
|     | o |
|     | o |
|     | o |
| L-4 | ld [r4], r9 |
|     | o |
|     | o |
|     | o |
|     | ld [r6], r2 |
| L-5 | ld [r4 + 5], r3 |

In this case, r4 is loaded on line L-3, then used on line L-4. During the aggressive insertion of prefetches, a prefetch will be added following line L-3 as follows.

| L-3 | ld [r5], r4 |
|     | pref [r4] |
|     | o |
|     | o |
| L-4 | ld [r4], r9 |
|     | o |
|     | o |
|     | o |
|     | ld [r6], r2 |
| L-5 | ld [r4 + 5], r3 |

Continuing with the code, the prefetch insertion module reaches line L-5. In this case the prefetch insertion module will note two things: (1) there is an existing prefetch using r4, and (2) the address pointed to by [r4+5] is likely to have been read into cache at the same time [r4] was. Therefore, no prefetch will be added for line L-5. This is because processors don't load single bytes from memory into cache. The smallest unit of transfer varies from processor to processor, but is typically 32 to 64 bytes. Thus, it is very likely that the contents of an address using r4 as a base and having a relatively small constant offset will already be in cache. In this case, no additional prefetch instruction will be added.

A key element of the idea being used in box 202 is that with a few explicit exceptions such as the one just described, and without the typical prior art regard for distance between the instructions, prefetch instructions are added for instructions labeled as cache misses very, very aggressively. It is fully anticipated that some set of exceptions to the general rule of inserting a prefetch instruction for every memory operation labeled as a cache miss may be made while staying fully within the inventive nature of the present disclosure.

After the actions in box 202 complete, box 204 is entered. Box 204 has the action of applying a code scheduler. The code scheduler itself, although part of a novel process, can be any one of those known in the relevant art. For example, schedulers may include one, or a combination of, a block scheduler, a global scheduler, a trace scheduler, or a software pipeline scheduler. Applying the scheduler to the code at box 204 will shift the order of individual instructions (lines of code) to maximize the efficiency of the target processor. This will typically change the distance from the prefetches to their associated memory operations. After applying a scheduler to the code being processed, box 204 is left and box 206 entered.

When using the words "target processor" in the present disclosure, it is to be understood that certain specifics of algorithms used in any portion of the present disclosure may be dependent on the specifics of the processor that is the "target processor", that is, the processor on which the compiled code is intended to be run. A "target processor" can mean anything from an unstated default target processor, to the processor type on which the compilation system is installed and currently running, to any processor that the compilation has the capability of understanding through any standard and well-known method such as flags set in parameters when calling the compilation system. All such meanings of "target processor" are fully compatible with, and contemplated by, the present disclosure, and are within the inventive nature of the current invention.

The process described from box 206 onward is at a more detailed level than boxes 200 through 204. The process described from box 206 to box 234 would be repeated for each file containing code that scheduler 204 passes to box 206.

Box 206 looks at the code inside a file passed by scheduler 204, and assigns an indicator to the first instruction found. The process continues to box 208, where the type of instruction that has the indicator is established. Box 208 determines if it is a memory operation, a prefetch, or neither a memory operation nor a prefetch instruction. The process continues to diamond 210, where a decision is made depending on the type of instruction found at the indicator. If the instruction type is not a memory operation, the "NO" exit is taken from diamond 210 to box 212. In box 212 the indicator is moved to the next instruction in the file, unless there are no more instructions. If there are no more instructions the process is finished. If there is another instruction, box 212 is left and box 208 entered, where the instruction type of the currently indicated instruction is determined and the method is ready to repeat.

Going back to diamond 210, if the instruction is a prefetch or memory operation, the "YES" exit is taken to diamond 214. Diamond 214 asks if the instruction is defined as a cache hit instruction. Such instructions are chosen using a set of heuristics, an example heuristic being instructions that reference stack variables. Heuristics may be included, added, or removed as deemed necessary. If the instruction is defined as a cache hit instruction, the "YES" exit is taken to box 216. Box 216 takes the action of removing "related" prefetch instructions. "Related" instructions are defined as follows.

"Related" instructions are any pair of memory operation instructions or prefetch instructions where each of the three following selection criteria is applies:

The memory addresses used by the instructions are within a small constant difference (where the actual definition of small is processor dependent) so that they are likely to be in the same cache line.

Where it is known the execution of the first instruction will lead to the execution of the second, or where there is a high probability that execution of the first instruction will lead to the execution of the second where "high probability" is a heuristic measure.

The distance in cycles, instructions, or memory operations between the two instructions is such that the cache line is likely to still be in the cache.

This definition captures the cases where the first of two "related" memory operations is highly likely to leave the data in the cache for the second memory operation. When referring to this definition of related in this disclosure, the word will appear in quotes as "related".

Continuing with box 216, any "related" prefetch instructions are removed from the previous instructions. The process now continues with box 218, where the indicated instruction is marked as a cache hit. Box 218 is complete and box 212 is now entered, where the indicator is moved to the next instruction or the process finishes, if there are no more instructions. Assuming there are more instructions, the process proceeds to box 208 where the newly indicated instruction has its type determined. The process is now ready to repeat with the new instruction.

Returning to diamond 214, the "NO" exit is taken when the instruction is not defined as a cache hit instruction. Diamond 220 is entered where the indicated memory operation is checked to see if it has any "related" instructions at all. Since "related" prefetches have been added very aggressively, ordinarily there won't be any memory operation without at least one "related" instruction. This step is an optional step, and can be used just in case a non-"related" memory operation were found in a code stream. If there are no "related" instructions, the "NO" exit is taken to box 222. In box 222 the instruction is marked as a cache miss instruction and as a martyr memory operation. Box 222 is then left and the process proceeds through box 212 and box 208, where a new instruction has been indicated and its type determined. The process is now ready to proceed with the new instruction.

Returning to diamond 220, if the instruction does have "related" instructions the "YES" exit is taken to diamond 224. In diamond 224 all the "related" instructions are checked to see if one of them is not a prefetch instruction. If there is an instruction that is not a prefetch instruction, diamond 224 is exited through the "YES" branch and box 218 is entered. The action taken in box 218 is to make the indicated instruction as a cache hit. Box 218 is then left and the process proceeds through box 212 and box 208, where a new instruction has been indicated and its type determined. The process is now ready to proceed with the new instruction.

Going back to diamond 224, if one of the "related" instructions is a prefetch instruction, then the "NO" exit is taken from diamond 224 to diamond 226. In diamond 226, the instructions between the indicated instruction and the "related" prefetch are searched for a martyr memory operation. If there is no martyr memory operation between the "related" prefetch and the indicated instruction, the "NO" exit is taken from diamond 226 to box 228. The action carried out in box 228 involves the removal of any "related" prefetch instructions. Box 228 is then left for box 222. The actions taken in box 222 are to mark the indicated instruction as a cache miss and as a martyr memory operation. Box 222 is then left and the process proceeds through box 212 and box 208, where a new instruction has been indicated and its type determined. The process is now ready to proceed with the new instruction.

The process shown in FIG. 2 is applied to all the instructions in each file that has been compiled. After the prefetch instruction scheduling algorithm has been applied, the code is scanned by the code scheduler again. This final code scheduling is undertaken to make use of any added benefits that may be found due to the removal of some of the prefetches that were formerly present.

Figure 3:
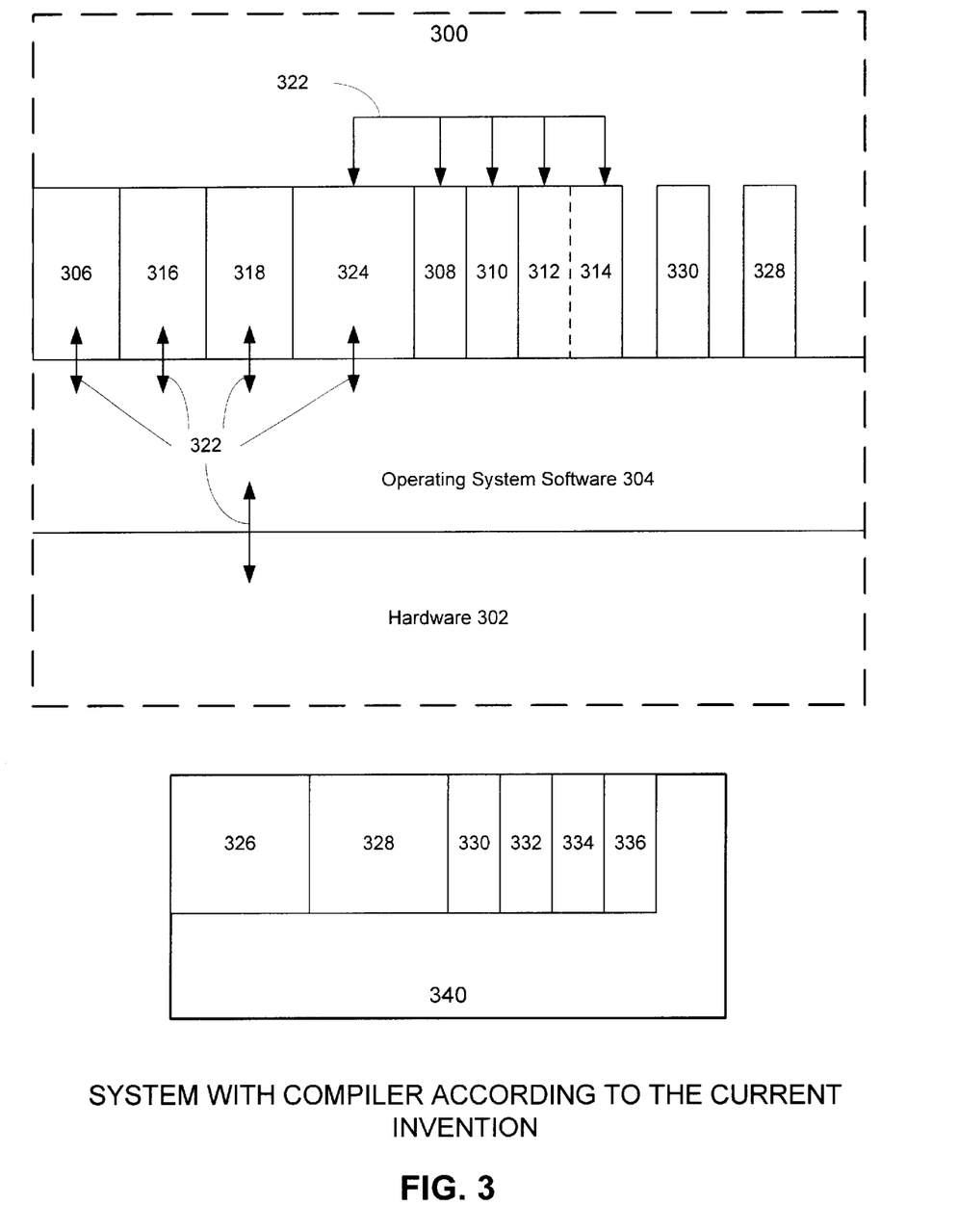
FIG. 3 is a block diagram of a system running the present invention.

FIG. 3 shows a block diagram of a system according to the present invention. Computing device 300 has a hardware base 302 and an operating system 304. These two components are of conventional design using well known components and are exemplified by a Sun Microsystems Ultra 60 Workstation running the Solaris v.7 operating system. The hardware and operating system must be minimally adaptable and configurable to act as support to run the present invention, such systems typically going under than name of workstations or servers. Any system providing enough system resources will work with the present invention. On top of operating system 304 are various applications, shown as 306, 316, 318, and 324. The arrows indicated by 320 show the parts of the system that are directly interacting with each other. Operating system 304 is continually interacting with hardware 302 as well as each of the applications 306, 316, 318 and 324. The application programs 306, 316, 318 and 324 make use of system services, system resources, and hardware resources through operating system 304.

Application 324 is a compiler program according to the present invention. The application programs 306, 316, 318 are shown for illustrative purposes only, and may or may not exist in any particular system on which the present invention is installed. They are not required nor are they a part of the present invention; they exist independently of, and may coexist with, the present invention.

Overall, compiler application 324 contains many functional modules including those needed to compile any given source code program into relocatable assembly code. The implementation of a compiler with modules according to the present invention may be implemented in a traditional language such as C or C++, or other suitable language. As will be appreciated by one of ordinary skill in the art and with the benefit of the present disclosure, the compiler may be implemented in any number of ways and with considerable variance in overall functionality while still encompassing the inventive nature of the present disclosure.

Continuing on in FIG. 3, compiler program 324 is reading from source files, using interim files, and writing to target files, shown as files 308, 310, 312 and 314. The interactions between compiler program 324 and the files are is indicated by communication arrows 322. Files 312 and 314 are physically one file, where a section of the file is shown as being separate for illustrative purposes. It contains temporary state information being used by the compiler. Source files, which may be library files or other system resident files, are shown as 328 and 330, and have not yet been called by the compiler. As will be appreciated by those of ordinary skill in the art and with the benefit of the present invention, there may be any number of source, target, and interim files.

Continuing with FIG. 3, the server's main memory is shown as 340. 326 is memory space taken up by the operating system. 328 is the main memory space occupied by the compiler application program according to the present invention. Source files, target files, and interim files are shown as 330, 332, 334, and 336.

Figure 4:
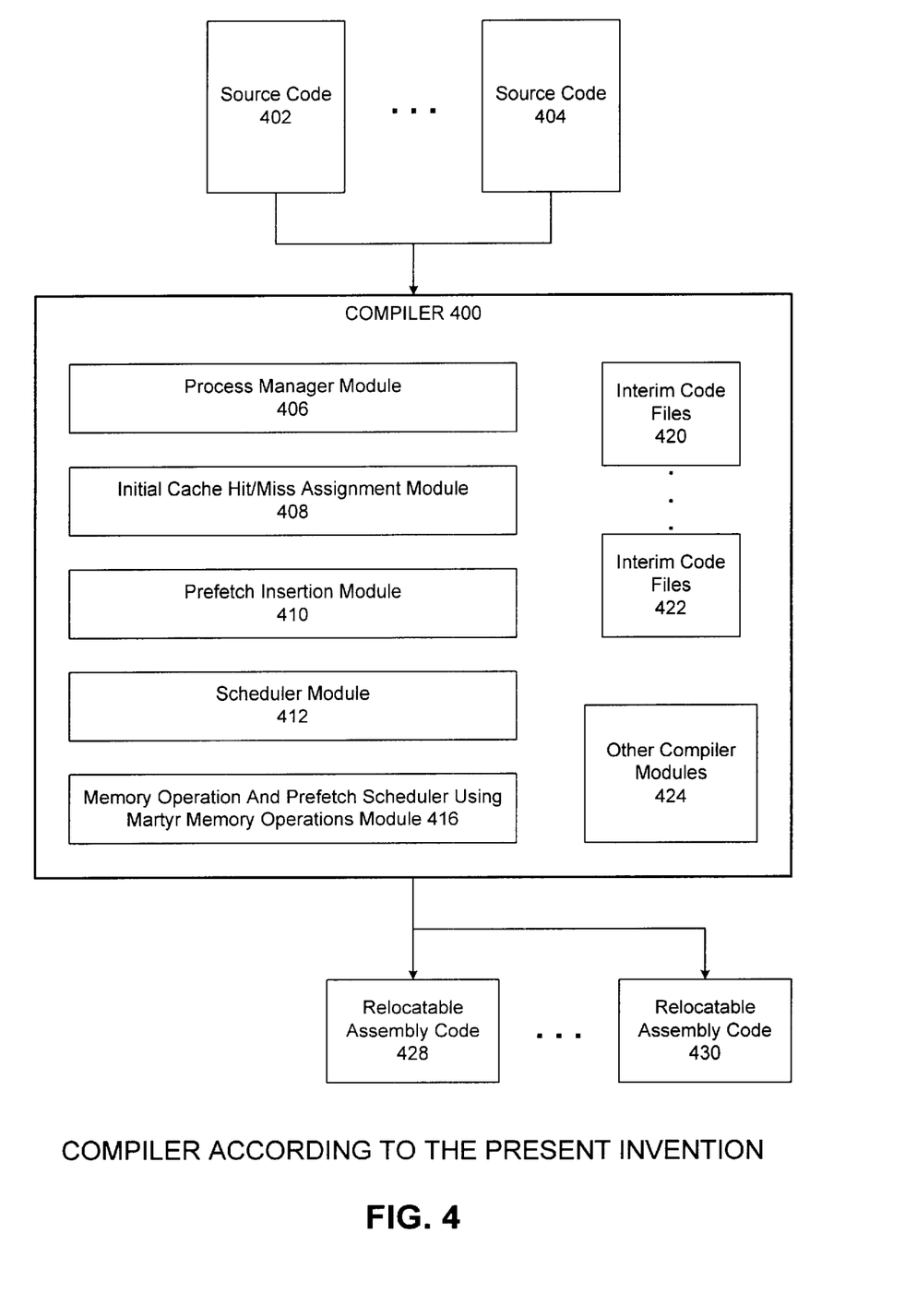
FIG. 4 is a block diagram of a compiler embodying the present invention.

FIG. 4 is a functional block diagram of a compiler program according to the present invention. Compiler 400 reads from source files, shown as 402 and 404. There may be any number of source files, indicated by the ellipses between source file 402 and source file 404. During the compilation process, various interim files are created, shown as files 420 and 422. There can be any number of such files, as shown by the ellipses between files 420 and 422. The overall process is controlled by process manager module 406.

When discussing functional module components implemented in software of the present invention, "module" is used to mean any collection of lines of code found on machine readable media that perform the indicated function. Typically such lines of functionally related code will be organized into a closely associated set of routines, files, functions, and other software engineering elements. However, regardless of how the actual lines of code are physically distributed in the code base that provides the functionality being described, those lines of code comprise the embodiment of the functional blocks.

After the source files are compiled into relocatable assembly code by other components of the compiler (shown generally as functional block 424), the assembly code files are passed by the process manager 406 to initial cache hit/miss assignment module 408.

After an initial assessment of each memory operation is made by module 408, process manager 406 passes control of the file or files to prefetch insertion module 410. Prefetch insertion module 410 handles the job of aggressively inserting prefetch instructions that are associated with cache miss instructions. The next module is scheduler module 412. Scheduler module 412 contains one or more standard approaches to scheduling the individual instructions in the instruction stream, the goal being to maximize the performance of the particular processor on which the compiled program will run.

After scheduler module 412 has changed the order of instructions to maximize performance of the target processor, process manager 406 passes control of the file or files to Memory Operation And Prefetch Scheduler Using Martyr Memory Operations Module 416.

Memory Operations And Prefetch Scheduler Using Martyr Memory Operations Module 416 carries out the algorithm described in FIG. 2. This includes scanning each instruction and, using the method described in FIG. 2, labeling certain memory operations as cache misses and martyr memory operations. At the same time it is identifying martyr memory operations, the algorithm uses the information to remove certain prefetches. Overall, this has the effect of maximizing the number of cache hits in the code base being processed.

After Memory Operation And Prefetch Scheduler Using Martyr Memory Operations Module 416 finishes, process manager 406 passes control of the file or files back to Scheduler Module 412. This step allows the code schedule to potentially make use of the fact that some prefetches will have been removed by Module 416. This final pass allows any final scheduling warranted that ma) now be done by the removal of prefetch instructions to be done. The amount of code scheduling that may be carried out in the final pass is not known, as it depends on the specifics of each code base coupled with the actions of Module 416 on that code base.

The result of the overall process is a set of relocatable assembly language file or files, shown as files 428 and 430. There may be any number of output files, depending on the input to compiler 400, as is indicated by the ellipses between files 428 and 430.

The present invention has been partially described through the use of a flow chart. As is appreciated by those of ordinary skill in the art and with the benefit of the present disclosure, the procedures described herein may be repeated as continuously, as often, or as little as necessary to satisfy the needs described and details or order of steps may vary without departing from the basic concepts of the present invention.

A compiler embodying the present invention will run on any computer system having a standard configuration as a development system. The present invention is embodied in various machine readable media on the system, on which are stored programs, data, and data structures. It is contemplated that any media suitable for use with the program and its accompanying data and data structures is within the scope of the present invention. Examples would include memory and other relatively fast-access semiconductor media, as well as magnetic or optical secondary storage media.

While embodiments and applications of this invention have been shown and described, it will be apparent to those or ordinary skill in the art and with the benefit of the present disclosure that many more modifications than mentioned above are possible without departing from the inventive concepts contained herein. The invention, therefore, is not to be restricted except in the spirit of the associated claims.

What is claimed is:

1. In a compilation system, a method for scheduling prefetch instructions and memory operation instructions in a code file having a plurality of instructions comprising:

(a) identifying a first subset of memory operation instructions as cache hit memory operations;

(b) identifying a second subset of memory operation instructions as cache miss memory operations;

(c) determining if an associated prefetch instruction is needed for each of said memory operation instructions in said second subset of memory operations;

(d) inserting an associated prefetch instruction for each of said memory operation instructions in said second subset of memory operations that has been determined to need an associated prefetch instruction;

(e) identifying which memory operation instructions in said second subset of memory operations are martyr memory operations; and, (f) deleting inserted prefetch instructions "related" to said identified martyr memory operations.

2. In the compilation system of claim 1, after inserting an associated prefetch instruction, the method further comprising:

(a) optimizing instruction order for a target processor.

3. In the compilation system of claim 2, after deleting prefetch instructions, the method further comprising:

(a) optimizing instruction order for said target processor.

4. In the compilation system of claim 1, wherein said inserting comprises:

(a) inserting an associated prefetch instruction for each of said memory operations in said second subset of memory operations that has not yet been determined to need an associated prefetch instruction.

5. In the compilation system of claim 1; wherein step (a) comprises identifying a first subset of memory operations as cache hit memory operations where each member of said first subset references a stack; and wherein step (b) comprises identifying a second subset of memory operations as cache miss memory operations where each member of said second subset does not reference a stack.

6. In the compilation system of claim 1; wherein step (a) comprises identifying a first subset of memory operations as cache hit memory operations where each member of said first subset is chosen using programmer input; and wherein step (b) comprises identifying a second subset of memory operations as cache miss memory operations where all memory operations in said plurality of instructions not chosen for said first subset of memory operations are in said second set of memory operations.

7. In the compilation system of claim 1; wherein step (a) comprises identifying a first subset of memory operations as cache hit memory operations where each member of said first subset is chosen using cache profiling; and wherein step (b) comprises identifying a second subset of memory operations as cache miss memory operations where all memory operations in said plurality of instructions not chosen for said first subset of memory operations are in said second set of memory operations.

8. In the compilation system of claim 1; wherein identifying a first subset and a second subset comprises:

identifying a cache-miss subset of memory operations as cache miss memory operations where each member of said subset is chosen using programmer input;

identifying a cache-hit subset of memory operations as cache hit memory operations where all memory operations in said plurality of instructions not chosen for said first subset of memory operations are in said second subset of memory operations; and, calling said cache-hit subset a first subset, and calling said cache-miss subset a second subset.

9. In the compilation system of claim 1; wherein identifying a first subset and a second subset comprises:

identifying a cache-miss subset of memory operations as cache miss memory operations where each member of said subset is chosen using cache profiling;

identifying a cache-hit subset of memory operations as cache hit memory operations where all memory operations in said plurality of instructions not chosen for said first subset of memory operations are in said second subset of memory operations; and calling said cache-hit subset a first subset, and calling said cache-miss subset a second subset.

10. In the compilation system of claim 1, before identifying a first subset, the method further comprising identifying at least one optimizing subset of instructions from said plurality of instructions, and where each of the following acts are applied to only said at least one optimizing subset.

11. In the compilation system of claim 1, wherein said deleting comprises:

removing a first prefetch instructions not having sufficient distance to a first "related" memory operation.

12. In the compilation system of claim 11, wherein said sufficient distance comprises a martyr memory operation.

13. In the compilation system of claim 11, wherein said sufficient distance comprises one of a subroutine call or a function call.

14. In the compilation system of claim 11, wherein said sufficient distance comprises a memory load operation.

15. In the compilation system of claim 1, wherein said deleting comprises:

deleting one of a first "related" instruction operating on a cache line and a second "related" instruction operating on said cache line, wherein there is no cache reload instruction between said "related" instructions.

16. In the compilation system of claim 1; wherein step (f) comprises deleting prefetch instruction in accordance with a first "related" instruction and a second "related" instruction where each of said "related" instructions has a base and an offset and where said offsets are less than a cache line apart.

17. In the compilation system of claim 1; wherein step (f) comprises deleting prefetch instruction in accordance with a first "related" instruction and a second "related" instruction where if said first "related" instruction is executed, said second "related" instruction is very likely to be executed.

18. A program storage device readable by a machine, tangibly embodying a program of instructions executable by a machine to perform a method for scheduling prefetch instructions and memory operation instructions in a code file having a plurality of instructions, the memory comprising:

(a) identifying a first subset of memory operation instructions as cache hit memory operations;

(b) identifying a second subset of memory operation instructions as cache miss memory operations;

(c) determining if an associated prefetch instruction is needed for each of said memory operation instructions in said second subset of memory operations;

(d) inserting an associated prefetch instruction for each of said memory operation instructions in said second subset of memory operations that has been determined to need an associated prefetch instruction;

(e) identifying which memory operation instructions in said second subset of memory operations are martyr memory operations; and, (f) deleting inserted prefetch instructions "related" to said identified martyr memory operations.

19. The program storage device of claim 18, after inserting an associated prefetch instruction, the method further comprising:

(a) optimizing instruction order for a target processor.

20. The program storage device of claim 19, after deleting prefetch instructions, the method further comprising:

(a) optimizing instruction order for said target processor.

21. The program storage device of claim 18; wherein step (d) comprises inserting an associated prefetch instruction for each of said memory operations in said second subset of memory operations that has not yet been determined to need an associated prefetch instruction.

22. The program storage device of claim 18: wherein step (a) comprises identifying a first subset of memory operations as cache hit memory operations where each member of said first subset references a stack; and wherein step (b) comprises identifying a second subset of memory operations as cache miss memory operations where each member of said second subset does not reference a stack.

23. The program storage device of claim 18: wherein step (a) comprises identifying a first subset of memory operations as cache hit memory operations where each member of said first subset is chosen using programmer input; and wherein step (b) comprises identifying a second subset of memory operations as cache miss memory operations where all memory operations in said plurality of instructions not chosen for said first subset of memory operations are in said second set of memory operations.

24. The program storage device of claim 18: wherein step (a) comprises identifying a first subset of memory operations as cache hit memory operations where each member of said first subset is chosen using cache profiling; and wherein step (b) comprises identifying a second subset of memory operations as cache miss memory operations where all memory operations in said plurality of instructions not chosen for said first subset of memory operations are in said second set of memory operations.

25. The program storage device of claim 18; wherein identifying a first subset and identifying a second subset comprises:

identifying a cache-miss subset of memory operations as cache miss memory operations where each member of said subset is chosen using programmer input;

identifying a cache-hit subset of memory operations as cache hit memory operations where all memory operations in said plurality of instructions not chosen for said first subset of memory operations are in said second set of memory operations; and calling said cache-hit subset a first subset, and calling said cache-miss subset a second subset.

26. The program storage device of claim 18; wherein identifying a first subset and identifying a second subset comprises:

identifying a cache-miss subset of memory operations as cache miss memory operations where each member of said subset is chosen using cache profiling;

identifying a cache-hit subset of memory operations as cache hit memory operations where all memory operations in said plurality of instructions not chosen for said first subset of memory operations are in said second set of memory operations; and calling said cache-hit subset a first subset, and calling said cache-miss subset a second subset.

27. The program storage device of claim 18, before identifying a first subset, the method further comprising identifying at least one optimizing subset of instructions from said plurality of instructions, and where each of the following acts are applied to only said at least one optimizing subset.

28. The program storage device of claim 18; wherein step (f) comprises removing a first prefetch instruction not having sufficient distance to a first "related" memory operation.

29. The program storage device of claim 28, wherein said sufficient distance comprises a martyr memory operation.

30. The program storage device of claim 28, wherein said sufficient distance comprises one of a subroutine call or a function call.

31. The program storage device of claim 28, wherein said sufficient distance comprises a memory load operation.

32. The program storage device of claim 18; wherein step (f) comprises deleting one of a first "related" instruction operating on a cache line and a second "related" instruction operating on said cache line, wherein there is no cache reload instruction between said "related" instructions.

33. The program storage device of claim 18; wherein step (f) comprises deleting prefetch instructions in accordance with a first "related" instruction and a second "related" instruction where each of said "related" instructions has a base and an offset and where said offsets are less than a cache line apart.

34. The program storage device of claim 18; wherein step (f) comprises deleting prefetch instructions in accordance with a first "related" instruction and a second "related" instruction where if said first "related" instruction is executed, said second "related" instruction is very likely to be executed.

35. A prefetch and memory instruction scheduler apparatus, in a computer system, for use in compiling a program, said apparatus comprising:
 an initial cache hit/miss assignment module operatively disposed within said apparatus and configured to:
  identify a first subset of memory operation instructions as cache hit memory operations; and
  identify a second subset of memory operation instructions as cache miss memory operations;
 a prefetch insertion module operatively disposed within said apparatus and configured to:
  determine if an associated prefetch instruction is needed for each of said memory operation instructions in said second subset of memory operations; and
  insert an associated prefetch instruction for each of said memory operation instructions in said second subset of memory operations that has been determined to need an associated prefetch instruction; and
 a scheduler module operatively disposed within said apparatus and configured to:
  identify which memory operation instructions in said second subset of memory operations are martyr memory operations; and
  delete inserted prefetch instructions "related" to said identified martyr memory operations.

36. The prefetch and memory instruction scheduler apparatus of claim 35 wherein said prefetch insertion module is further configured to insert an associated prefetch instruction for each of said memory operations in said second subset of memory operations.

37. The prefetch and memory instruction scheduler apparatus of claim 35 wherein said initial cache hit/miss assignment module is further configured to:
 identify a first subset of memory operations as cache hit memory operations, wherein each member of said first subset references a stack; and
 identify a second subset of memory operations as cache miss memory operations, wherein each member of said second subset does not reference a stack.

38. The prefetch and memory instruction scheduler apparatus of claim 35 wherein said scheduler module is further configured to identify a first optimize subset of instructions from said program, and further where only said first optimize subset will be optimized in said apparatus.

39. A method of inserting prefetch instructions during compilation of a computer program, the method comprising:
 selecting a set of instructions in a computer program as likely cache-misses;
 inserting in the computer program a plurality of prefetch instructions associated with a subset of the set of instructions;
 scheduling said set of instructions;
 identifying one or more martyr instructions in said subset of instructions; and
 deleting any of said inserted prefetch instructions associated with said one or more martyr instructions.

40. The method of claim 39, further comprising:
 determining whether a first instruction and a second instruction in the computer program are "related," wherein said first instruction and said second instruction are determined to be "related" if:
  memory addresses used by said first instruction and said second instruction are likely to be on the same cache line;
  there is a relatively high probability that said second instruction will be executed if said first instruction is executed; and
  said same cache line is likely to be cached when said second instruction is executed.

41. The method of claim 39, wherein a martyr instruction is an instruction for which no associated prefetch instruction is inserted during said inserting.

42. The method of claim 39, wherein said inserting comprises inserting in the computer program, for every instruction in said subset of instructions, an associated prefetch instruction.

43. The method of claim 39, wherein said identifying a martyr instruction comprises:
 selecting an instruction in the computer program;
 determining whether said instruction is likely to be a cache hit; and
 determining whether another instruction in the computer program is "related" to said instruction;
 wherein said instruction is identified as a martyr instruction if:
  said instruction is not likely to be a cache hit; and
  no other instruction in the computer program is "related" to said instruction.

44. The method of claim 39, wherein said identifying a martyr instruction comprises:
 selecting an instruction in the computer program; and
 determining whether another instruction in the computer program is "related" to said instruction;
 wherein said instruction is identified as a martyr instruction if no other instruction in the computer program is "related" to said instruction.

45. The method of claim 39, wherein said identifying a martyr instruction comprises:
 selecting an instruction in the computer program; and
 determining whether another instruction in the computer program is "related" to said instruction;
 wherein said instruction is identified as a martyr instruction if:
  one or more other instructions in the computer program are "related" to said instruction;
  each of said one or more other instructions is a prefetch instruction; and
  no martyr instruction is scheduled between said instruction and said one or more other instructions.

46. A system for inserting prefetch instructions during compilation of a computer program, the system comprising:

a cache hit/miss assignment module configured to select a set of instructions in a computer program as likely cache-misses;

a prefetch insertion module configured to insert in the computer program a plurality of prefetch instructions associated with a subset of the set of instructions;

a scheduler configured to schedule said set of instructions; and an operations module configured to:
identify one or more martyr instructions in said subset of instructions; and
delete any of said inserted prefetch instructions associated with said one or more martyr instructions.

47. The system of claim 46, further comprising:
a process manager module configured to control operation of said cache hit/miss assignment module, said prefetch insertion module, said scheduler and said operations module as they process the computer program.

48. The system of claim 47, wherein said scheduler is configured to:

process the computer program a first time before said operations module processes the computer program; and process the computer program a second time after said operations module processes the computer program.

49. The system of claim 46, wherein a martyr instruction is an instruction for which no associated prefetch instruction is inserted by said prefetch insertion module.

50. The system of claim 46, wherein said operations module identifies a martyr instruction by:

selecting an instruction in the computer program;

determining whether said instruction is likely to be a cache hit; and determining whether another instruction in the computer program is "related" to said instruction;

wherein said instruction is identified as a martyr instruction if:
said instruction is not likely to be a cache hit; and
no other instruction in the computer program is "related" to said instruction.

51. The system of claim 46, wherein said operations module identifies a martyr instruction by:

selecting an instruction in the computer program; and determining whether another instruction in the computer program is "related" to said instruction;

wherein said instruction is identified as a martyr instruction if no other instruction in the computer program is "related" to said instruction.

52. The system of claim 46, wherein said operations module identifies a martyr instruction by:

selecting an instruction in the computer program; and determining whether another instruction in the computer program is "related" to said instruction;

wherein said instruction is identified as a martyr instruction if:
one or more other instructions in the computer program are "related" to said instruction;
each of said one or more other instructions is a prefetch instruction; and
no martyr instruction is scheduled between said instruction and said one or more other instructions.

* * * * *

UNITED STATES PATENT AND TRADEMARK OFFICE
CERTIFICATE OF CORRECTION

PATENT NO. : 6,651,245 B1   Page 1 of 1
DATED : November 18, 2003
INVENTOR(S) : Damron et al.

It is certified that error appears in the above-identified patent and that said Letters Patent is hereby corrected as shown below:

Column 12,
Line 11, delete "(a)";

Column 13,
Line 8, replace "instructions" with -- instruction --.

Signed and Sealed this

Second Day of March, 2004

JON W. DUDAS
*Acting Director of the United States Patent and Trademark Office*